(12) United States Patent
Fujimoto et al.

(10) Patent No.: US 10,421,351 B2
(45) Date of Patent: Sep. 24, 2019

(54) IN-WHEEL MOTOR SYSTEM

(71) Applicants: THE UNIVERSITY OF TOKYO, Bunkyo-ku, Tokyo (JP); NSK Ltd., Shinagawa-ku, Tokyo (JP); TOYO ELECTRIC MFG. CO., LTD., Chuou-ku, Tokyo (JP)

(72) Inventors: Hiroshi Fujimoto, Tokyo (JP); Takehiro Imura, Tokyo (JP); Gaku Yamamoto, Tokyo (JP); Daisuke Gunji, Tokyo (JP); Motoki Sato, Yokohama (JP)

(73) Assignees: THE UNIVERSITY OF TOKYO, Bunkyo-ku, Tokyo (JP); NSK Ltd., Shinagawa-ku, Tokyo (JP); TOKYO ELECTRIC MFG. CO., LTD., Chuou-ku, Tokyo (JP)

( * ) Notice: Subject to any disclaimer, the term of this patent is extended or adjusted under 35 U.S.C. 154(b) by 276 days.

(21) Appl. No.: 15/123,731

(22) PCT Filed: Feb. 16, 2015

(86) PCT No.: PCT/JP2015/054897
§ 371 (c)(1),
(2) Date: Sep. 6, 2016

(87) PCT Pub. No.: WO2015/133301
PCT Pub. Date: Sep. 11, 2015

(65) Prior Publication Data
US 2017/0008385 A1   Jan. 12, 2017
US 2018/0111473 A2   Apr. 26, 2018

(30) Foreign Application Priority Data
Mar. 7, 2014   (JP) ................ 2014-045477

(51) Int. Cl.
B60K 7/00   (2006.01)
B60L 7/14   (2006.01)
(Continued)

(52) U.S. Cl.
CPC .............. B60K 7/0007 (2013.01); B60L 7/14 (2013.01); B60L 15/007 (2013.01);
(Continued)

(58) Field of Classification Search
CPC . H02K 7/075; H02K 9/04; B60K 1/00; B60L 11/18; B60L 8/00; B60L 7/14;
(Continued)

(56) References Cited

U.S. PATENT DOCUMENTS 9,660,487 B1 *   5/2017   Mu ..................... H02J 50/10
2004/0218406 A1 * 11/2004  Jang .................... H02J 5/005
                                                        363/37
(Continued)

FOREIGN PATENT DOCUMENTS

JP   H10210040 A   8/1998
JP   2001298879 A  10/2001
(Continued)

OTHER PUBLICATIONS

WO 2013076806 A1 machine translation, Aug. 2, 2018.*
(Continued)

*Primary Examiner* — Julio C. Gonzalez
*Assistant Examiner* — Leda T Pham
(74) *Attorney, Agent, or Firm* — Kenja IP Law PC

(57) ABSTRACT

An in-wheel motor system can drive an in-wheel motor stably, and also allows power feeding from the road surface, even when transmission and reception coils are misaligned. An in-wheel motor system (1) includes a power transmitter (100) that utilizes a resonance phenomenon using a magnetic field. The power transmitter (100) transmits power (P) wirelessly from the vehicle body to an in-wheel motor (10) mounted in a wheel. The in-wheel motor system (1) may also include a communication interface (110) that communicates between the vehicle body and the wheel, and the communication interface (110) may transmit a control signal (CTL) for driving the in-wheel motor.

11 Claims, 7 Drawing Sheets

(51) Int. Cl.
  B60L 15/00 (2006.01)
  B60L 15/20 (2006.01)
  H02J 50/12 (2016.01)
  H02J 50/80 (2016.01)
  H02K 7/14 (2006.01)
  H02P 6/14 (2016.01)
  H02P 27/08 (2006.01)
  B60L 50/40 (2019.01)
  B60L 50/51 (2019.01)
  B60L 53/12 (2019.01)
  B60L 58/21 (2019.01)
  B60L 50/60 (2019.01)

(52) U.S. Cl.
  CPC .......... *B60L 15/2009* (2013.01); *B60L 50/40* (2019.02); *B60L 50/51* (2019.02); *B60L 50/66* (2019.02); *B60L 53/12* (2019.02); *B60L 58/21* (2019.02); *H02J 50/12* (2016.02); *H02J 50/80* (2016.02); *H02K 7/14* (2013.01); *H02P 6/14* (2013.01); *H02P 27/08* (2013.01); *B60K 2007/0038* (2013.01); *B60K 2007/0092* (2013.01); *B60L 2210/10* (2013.01); *B60L 2210/42* (2013.01); *B60L 2220/44* (2013.01); *B60L 2240/12* (2013.01); *B60L 2240/421* (2013.01); *B60L 2240/423* (2013.01); *Y02T 10/645* (2013.01); *Y02T 10/646* (2013.01); *Y02T 10/7005* (2013.01); *Y02T 10/7061* (2013.01); *Y02T 10/7072* (2013.01); *Y02T 10/7216* (2013.01); *Y02T 10/7275* (2013.01); *Y02T 90/122* (2013.01); *Y02T 90/127* (2013.01); *Y02T 90/14* (2013.01); *Y02T 90/16* (2013.01)

(58) Field of Classification Search
  CPC .. B60L 11/005; B60L 11/1803; B60L 11/182; B60L 11/1833; B60L 11/1859; B60L 15/2009; B60L 15/2036; H02J 5/005; H02J 7/025; H02J 50/10
  See application file for complete search history.

(56) References Cited

U.S. PATENT DOCUMENTS

| | | | | |
|---|---|---|---|---|
| 2009/0143940 A1* | 6/2009 | Rhodes | .................. | B62D 11/02 701/41 |
| 2010/0256946 A1* | 10/2010 | Carresjo | ............. | B60C 23/0462 702/138 |
| 2011/0254377 A1* | 10/2011 | Wildmer | ............... | B60L 11/182 307/104 |
| 2012/0127765 A1* | 5/2012 | Maruyama | .............. | H02J 50/12 363/126 |
| 2013/0345916 A1* | 12/2013 | Ozaki | .................. | B60K 7/0007 701/22 |

FOREIGN PATENT DOCUMENTS

| | | | |
|---|---|---|---|
| JP | 2008260332 A | 10/2008 | |
| JP | 2012125138 A | 6/2012 | |
| JP | 2012157082 A | 8/2012 | |
| JP | 2013005544 A | 1/2013 | |
| JP | 2013172500 A | 9/2013 | |
| JP | 2014039469 A | 2/2014 | |
| WO | 2013076806 A1 | 5/2013 | |
| WO | WO 2013076806 A1 * | 5/2013 | ............... B60L 7/14 |
| WO | 2013098928 A1 | 7/2013 | |

OTHER PUBLICATIONS

Mar. 28, 2017, Notification of Reasons for Refusal issued by the Japan Patent Office in the corresponding Japanese Patent Application No. 2016-506425.
Mar. 19, 2018, Office Action issued by the Taiwan Intellectual Property Office in the corresponding Taiwanese Patent Application No. 104107284.
Feb. 20, 2018, Office Action issued by the Korean Intellectual Property Office in the corresponding Korean Patent Application No. 10-2016-7027819.
Sep. 13, 2016, International Preliminary Report on Patentability issued in the International Patent Application No. PCT/JP2015/054897.
Apr. 28, 2015, International Search Report issued in the International Patent Application No. PCT/JP2015/054897.
Jan. 22, 2018, Extended European Search Report issued by the European Patent Office in the corresponding European Patent Application No. 15759129.8.
Nov. 21, 2018, Communication pursuant to Article 94(3) EPC issued by the European Patent Office in the corresponding European Patent Application No. 15759129.8.
Aug. 30, 2018, Office Action issued by the Korean Intellectual Property Office in the corresponding Korean Patent Application No. 10-2016-7027819.
May 27, 2019, Summons to attend oral proceedings pursuant to Rule 115(1) EPC issued by the European Patent Office in the corresponding European Patent Application No. 15759129.8.
S. Y. (Ron) Hui et al., Resonant and Soft-switching Converters, Power electronics handbook: devices, circuits, and applications, Jan. 1, 2011, pp. 409-453, Elsevier/BH, Butterworth-Heinemann, Amsterdam [u.a.], XP055578045, ISBN: 978-0-12-382036-5, DOI: 10.1016/B978-0-12-382036-5.00016-1.

* cited by examiner

IN-WHEEL MOTOR SYSTEM

CROSS-REFERENCE TO RELATED APPLICATION

This application claims priority to and the benefit of Japanese Patent Application No. 2014-45477 filed Mar. 7, 2014, the entire contents of which are incorporated herein by reference.

TECHNICAL FIELD

This disclosure relates to an in-wheel motor system that controls an in-wheel motor in which a driving source is disposed inside a wheel of an electric car or the like.

BACKGROUND

An electric car or the like preferably includes an in-wheel motor in which a driving source is disposed inside a wheel, since driving power can be transferred directly to a tire. Conventionally, power has typically been supplied to an in-wheel motor from the vehicle body side by a wire.

By changing to a wireless power supply, improved reliability with respect to the risk of wire disconnection and support for power feeding from the road can be expected. For example, JP 2013-5544 A (PTL 1) discloses a technique for a wheel power feeding apparatus provided with a non-contact electromagnetic power feeder that uses the phenomenon of electromagnetic induction.

CITATION LIST

Patent Literature

PTL 1: JP 2013-5544 A

SUMMARY

Technical Problem

Since an in-wheel motor is displaced relative to the vehicle body due to movement of the suspension, however, misalignment occurs (specifically, misalignment of the transmission and reception coils). In the non-contact electromagnetic power feeder that uses the phenomenon of electromagnetic induction, the efficiency of power feeding decreases due to misalignment, yielding a high possibility of not being able to feed sufficient power to the in-wheel motor. For similar reasons, it is difficult to implement power feeding from the road surface.

Therefore, it would be helpful to provide an in-wheel motor system that can drive an in-wheel motor stably, and that also allows power feeding from the road surface, even when the transmission and reception coils are misaligned.

Solution to Problem

In order to resolve the aforementioned problem, an in-wheel motor system according to this disclosure includes: a power transmitter that utilizes a resonance phenomenon using a magnetic field; wherein the power transmitter transmits power wirelessly from a vehicle body to an in-wheel motor mounted in a wheel.

The in-wheel motor system according to this disclosure preferably further includes a communication interface configured to communicate between the vehicle body and the wheel; wherein the communication interface preferably transmits a control signal for driving the in-wheel motor.

The in-wheel motor system according to this disclosure preferably further includes the in-wheel motor; a motor conversion unit configured to convert a first DC voltage into a motor AC voltage that drives the in-wheel motor during powering; a wheel side capacitor configured to smooth the first DC voltage during powering; and a wheel side conversion unit configured to convert a first AC voltage from a wheel side coil into the first DC voltage during powering; wherein the power transmitter preferably includes: the wheel side coil, configured to receive wirelessly transmitted power at the wheel side during powering; and a wheel side resonance capacitor inserted in series between the wheel side conversion unit and the wheel side coil.

The in-wheel motor system according to this disclosure preferably further includes a wheel side controller configured to control, with a first control signal, switching of a switch provided in the wheel side conversion unit; wherein the wheel side controller preferably generates the first control signal so as to control the first DC voltage to be constant.

In the in-wheel motor system according to this disclosure, the wheel side controller preferably generates the first control signal so that a fundamental power factor of the first AC voltage and a current of the wheel side coil becomes 1.

In the in-wheel motor system according to this disclosure, with the first control signal, the wheel side controller preferably adjusts a duration that the first AC voltage is zero.

The in-wheel motor system according to this disclosure preferably further includes a wheel side current detector configured to detect a current of the wheel side conversion unit; wherein the wheel side controller preferably detects a sign change in the current of the wheel side conversion unit with the wheel side current detector and generates the first control signal in accordance with information on the detected sign change.

The in-wheel motor system according to this disclosure preferably further includes a voltage detector configured to detect the first DC voltage; wherein the wheel side controller preferably generates the first control signal in accordance with a difference between a value detected by the voltage detector and a target value of the first DC voltage.

In the in-wheel motor system according to this disclosure, the wheel side controller preferably generates the first control signal in accordance with a number of revolutions and a torque command value of the in-wheel motor.

The in-wheel motor system according to this disclosure preferably further includes a vehicle body side conversion unit configured to convert a second DC voltage from a battery into a second AC voltage and output the second AC voltage to a vehicle body side coil during powering; and the battery; wherein the power transmitter preferably includes: the vehicle body side coil, configured to transmit power wirelessly from the vehicle body during powering; and a vehicle body side resonance capacitor inserted in series between the vehicle body side conversion unit and the vehicle body side coil.

The in-wheel motor system according to this disclosure preferably further includes a vehicle body side controller configured to control, with a second control signal, switching of a switch provided in the vehicle body side conversion unit in accordance with a control signal from the communication interface; wherein the vehicle body side controller preferably generates the second control signal so as to control the first DC voltage to be constant.

In the in-wheel motor system according to this disclosure, the vehicle body side controller preferably generates the second control signal in accordance with a number of revolutions and a torque command value of the in-wheel motor.

The in-wheel motor system according to this disclosure preferably further includes a vehicle body side current detector configured to detect a current of the vehicle body side conversion unit; wherein the vehicle body side controller preferably generates the second control signal in accordance with a difference between a value detected by the vehicle body side current detector and a target current value corresponding to a number of revolutions and a torque command value of the in-wheel motor.

In the in-wheel motor system according to this disclosure, during regeneration of the in-wheel motor, the wheel side conversion unit preferably functions as an inverter, and the vehicle body side conversion unit preferably functions as a converter.

Advantageous Effect

According to the in-wheel motor system of this disclosure, an in-wheel motor system can drive an in-wheel motor stably, and also allows power feeding from the road surface, even when the transmission and reception coils are misaligned.

DETAILED DESCRIPTION (Overall Structure)

Figure 1:
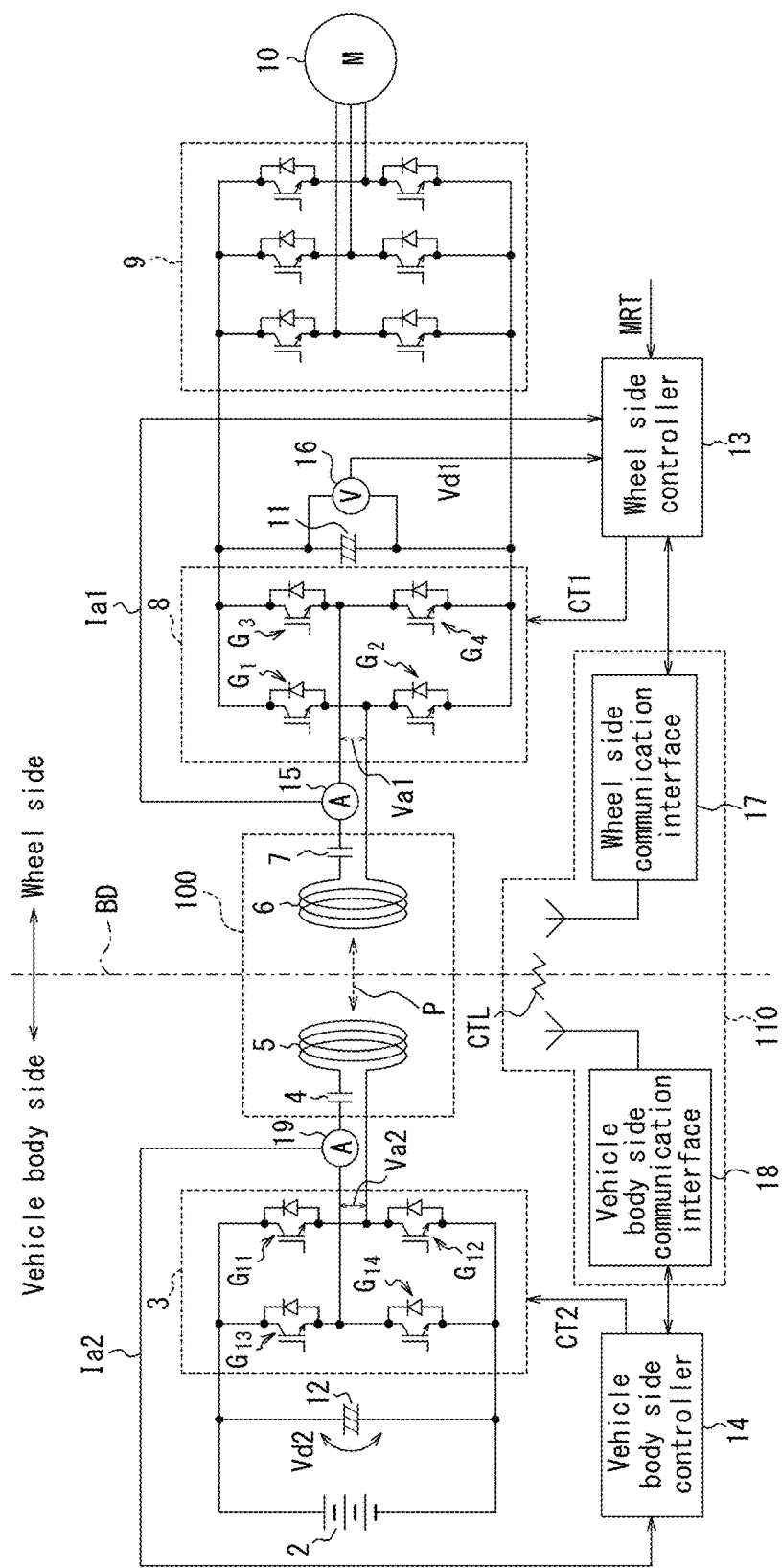
FIG. 1 is a schematic diagram of an in-wheel motor system according to this embodiment.

Embodiments of an in-wheel motor system 1 according to this disclosure are described with reference to the drawings. While the in-wheel motor system 1 may be used in a variety of vehicles that have wheels, the in-wheel motor system 1 is described below as being used in an automobile in this embodiment. FIG. 1 illustrates the structure of the in-wheel motor system 1 of this embodiment. First, with reference to FIG. 1, a power transmitter 100 and a communication interface 110 are described as the overall structure of the in-wheel motor system 1.

The in-wheel motor system 1 is provided with an in-wheel motor 10, which is a motor embedded in a wheel, and causes the automobile to move by rotating the in-wheel motor 10. The in-wheel motor system 1 is installed in the vehicle body side and the wheel side of the automobile. The in-wheel motor system 1 is also provided with the power transmitter 100, which transmits and receives power P wirelessly between the vehicle body side and the wheel side.

The power transmitter 100 transmits power wirelessly with a method that utilizes a resonance phenomenon using a magnetic field. The power transmitter 100 can transmit the necessary power P from the vehicle body side to the wheel side wirelessly when powering the in-wheel motor 10. The power transmitter 100 can also transmit regenerative power from the wheel side to the vehicle body side when the in-wheel motor 10 is regenerating (for example, when the automobile is decelerating). The in-wheel motor system 1 transmits and receives power P between the vehicle body side and the wheel side of the automobile wirelessly, without using a wire. Therefore, reliability with respect to the risk of wire disconnection can be improved.

A method that can perform sufficient power feeding to the in-wheel motor 10 even when the wheel is displaced relative to the vehicle body due to movement of the suspension is selected as the method, used by the power transmitter 100, that utilizes a resonance phenomenon using a magnetic field. For example, methods typically referred to as an electromagnetic resonance method or magnetic resonance coupling method may be selected. Unlike electromagnetic induction, magnetic resonance coupling has circuit topology with the same resonant frequency on the primary side (i.e. the vehicle body side) and the secondary side (i.e. the wheel side). The magnetic resonance coupling method tolerates misalignment (in the example in FIG. 1, misalignment between the vehicle body side coil 5 and the wheel side coil 6) better than an electromagnetic induction method. In the case of the electromagnetic induction method, sufficient power P can no longer be transmitted upon even slight misalignment. Conversely, with the magnetic resonance coupling method, it is known that if the Q of the coil (in the example in FIG. 1, the Q of the vehicle body side coil 5 and the wheel side coil 6) is high, power P can be transmitted at a high transmission efficiency even if the coupling coefficient falls.

Figure 2:
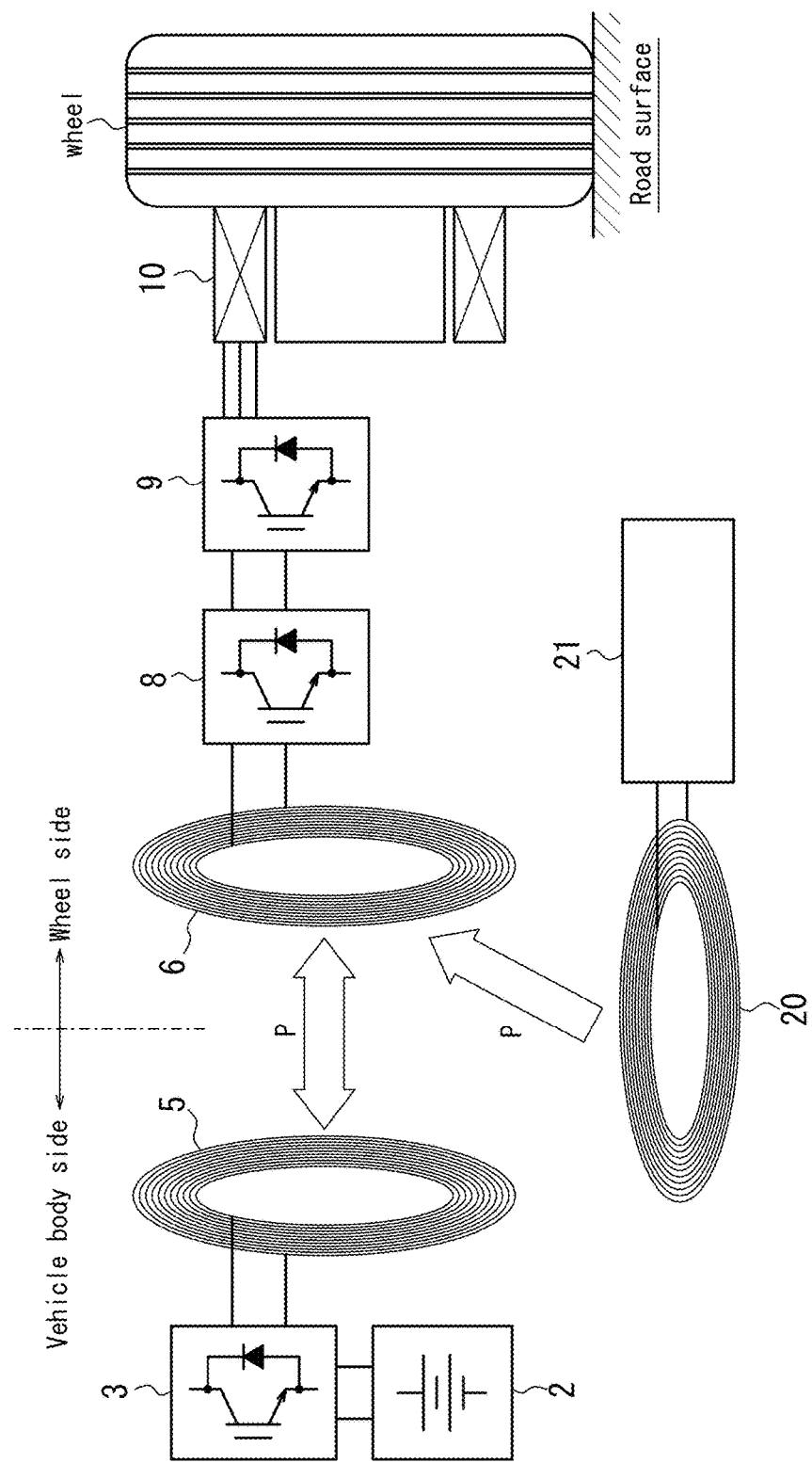
FIG. 2 illustrates power transmission that can be implemented by the in-wheel motor system of this embodiment.

By the power transmitter 100 using a method that utilizes a resonance phenomenon using a magnetic field, the in-wheel motor system 1 according to this disclosure not only allows wireless supply of power P between the vehicle body and the wheel, but also allows wireless transmission of power P from the road surface to the wheel (power feeding from the road surface), as illustrated in FIG. 2. A power supply 21 and coil 20 in FIG. 2 are embedded in the road surface. The structure of the power supply 21 and coil 20 may be the same as that of the below-described battery 2 and vehicle body side coil 5. The other elements in FIG. 2 are labeled with the same reference signs as in FIG. 1 and are described below with reference to FIG. 1. Hence, these elements are not referred to here.

The explanation now returns to FIG. 1. The in-wheel motor system 1 is provided with the communication interface 110, which wirelessly transmits a control signal CTL for driving the in-wheel motor 10 between the vehicle body side and the wheel side. The communication interface 110 for example includes a wheel side communication interface 17 and a vehicle body side communication interface 18, each of which has a wireless antenna and can transmit and receive the control signal CTL. The wheel side communication interface 17 and the vehicle body side communication interface 18 are respectively connected to the below-described wheel side controller 13 and vehicle body side controller 14. Therefore, with the control signal CTL, the vehicle body side controller 14 for example can execute control in accordance with the number of revolutions and the torque command value of the in-wheel motor 10 on the wheel side. Bluetooth® (Bluetooth is a registered trademark in Japan, other countries, or both), a wireless LAN standard, or the like may, for example, be used as the method of wireless communication by the communication interface 110.

The overall structure of the in-wheel motor system 1 is described here in detail. Unless regeneration is specifically indicated, it is assumed below that the in-wheel motor 10 is being powered. As illustrated in FIG. 1, the in-wheel motor system 1 is provided with the in-wheel motor 10, a motor conversion unit 9 that converts a first DC voltage $Vd1$ into motor AC voltage that drives the in-wheel motor 10, a wheel side capacitor 11 that smoothes the first DC voltage $Vd1$, a wheel side conversion unit 8 that converts a first AC voltage $Va1$ from the wheel side coil 6 into the first DC voltage $Vd1$, a vehicle body side conversion unit 3 that converts a second DC voltage $Vd2$ from the battery 2 into a second AC voltage $Va2$ and outputs the second AC voltage $Va2$ to the vehicle body side coil 5, and the battery 2. A capacitor 12 in parallel with the battery 2 may be provided on the vehicle body side. The capacitor 12 corresponds to the wheel side capacitor 11 and is provided to stabilize the second DC voltage $Vd2$. The power transmitter 100 of the in-wheel motor 10 is provided with the wheel side coil 6, which receives the wirelessly transmitted power P at the wheel side; a wheel side resonance capacitor 7 inserted in series between the wheel side conversion unit 8 and the wheel side coil 6; the vehicle body side coil 5, which wirelessly transmits power P from the vehicle body; and a vehicle body side resonance capacitor 4 inserted in series between the vehicle body side conversion unit 3 and the vehicle body side coil 5. The vehicle body side coil 5 and the wheel side coil 6 are also referred to as antennas. In the example in FIG. 1, the motor conversion unit 9 is a three-phase voltage-type inverter configured with an Insulated Gate Bipolar Transistor (IGBT), but the motor conversion unit 9 is not limited to this configuration.

In this embodiment, the wheel side conversion unit 8 of the in-wheel motor system 1 is configured with four full bridge switches G1, G2, G3, and G4 (switches G1 to G4). Like the wheel side conversion unit 8, the vehicle body side conversion unit 3 is also configured with four full bridge switches G11, G12, G13, and G14 (switches G11 to G14). The in-wheel motor system 1 is provided with the wheel side controller 13, which uses a first control signal CT1 to control switching of the switches G1 to G4 provided in the wheel side conversion unit 8. The in-wheel motor system 1 is provided with the vehicle body side controller 14, which controls switching of the switches G11 to G14 provided in the vehicle body side conversion unit 3 with a second control signal CT2. For example, the switches G1 to G4 and the switches G11 to G14 may be, but are not limited to, insulated gate bipolar transistors.

As illustrated in FIG. 1, the aforementioned constituent elements of the in-wheel motor system 1 are divided between the vehicle body side and the wheel side. Specifically, the battery 2, capacitor 12, vehicle body side conversion unit 3, vehicle body side resonance capacitor 4, vehicle body side coil 5, vehicle body side controller 14, and vehicle body side communication interface 18 are disposed on the vehicle body side. The in-wheel motor 10, motor conversion unit 9, wheel side capacitor 11, wheel side conversion unit 8, wheel side resonance capacitor 7, wheel side coil 6, wheel side controller 13, and wheel side communication interface 17 are disposed on the wheel side. There is no wire connection between the vehicle body side coil 5 and wheel side coil 6 that transmit and receive power P, nor is there any wire connection between the wheel side communication interface 17 and the vehicle body side communication interface 18 that transmit and receive the control signal CTL. Accordingly, reliability with respect to the risk of wire disconnection can be improved as mentioned above, and power feeding from the road surface is also possible (see FIG. 2).

The wheel side controller 13 and vehicle body side controller 14 respectively generate the first control signal CT1 and the second control signal CT2 so as to control the first DC voltage $Vd1$ to be constant. Details on the first control signal CT1 and the second control signal CT2 are provided below.

It is known that during wireless transmission of power P with the magnetic resonance coupling method, the voltage and current on the secondary side, i.e. the wheel side, vary with respect to variation in the load (motor conversion unit 9 and in-wheel motor 10) and relative displacement of the power transmission and reception coils (vehicle body side coil 5 and wheel side coil 6). By contrast, in the motor conversion unit 9, which is a voltage-type inverter that drives the in-wheel motor 10, it is generally necessary to keep the DC link voltage, i.e. the first DC voltage $Vd1$, constant. Therefore, the wheel side controller 13 and vehicle body side controller 14 generate the first control signal CT1 and the second control signal CT2 appropriately to control the first DC voltage $Vd1$ to be constant. It suffices for at least one of the wheel side controller 13 and the vehicle body side controller 14 to execute control that keeps the first DC voltage $Vd1$ constant.

For example, in order to keep the first DC voltage $Vd1$ constant, the wheel side controller 13 may generate the first control signal CT1 so that the fundamental power factor of the first AC voltage $Va1$ and the current $Ia1$ of the wheel side coil 6 becomes 1. At this time, the wheel side controller 13 may adjust the duration that the first AC voltage $Va1$ is zero so that the fundamental power factor becomes 1.

The in-wheel motor system 1 can also perform control to cause only the wheel side to function. As described below, by using the first control signal CT1 to control switching of the switches G1 to G4 provided in the wheel side conversion unit 8, the wheel side controller 13 can adjust variation in the power P at the wheel side alone, independent from the vehicle body side.

The in-wheel motor system 1 may be provided with a wheel side current detector 15, a voltage detector 16, and a vehicle body side current detector 19, as illustrated in FIG. 1, for use in the aforementioned control by the wheel side controller 13 and the vehicle body side controller 14. The wheel side current detector 15 may, for example, be a current sensor that detects the current $Ia1$ of the wheel side coil 6 and outputs the detected value to the wheel side controller 13. The wheel side controller 13 may detect a sign change in the current $Ia1$ of the wheel side coil 6 and generate the first control signal CT1 in accordance with information on the detected sign change.

The voltage detector 16 may, for example, be a voltage sensor that detects the first DC voltage $Vd1$ and outputs the detected value to the wheel side controller 13. The wheel side controller 13 may generate a first control signal CT1 in accordance with the difference between the detected value of the first DC voltage $Vd1$ and a target value of the first DC voltage $Vd1$. Here, the wheel side controller 13 may generate the first control signal CT1 in accordance with the number of revolutions and the torque command value of the in-wheel motor 10, which indicate the actual running state and the like of the automobile. At this time, the wheel side controller 13 may receive the number of revolutions of the in-wheel motor 10 as a signal MRT and receive the torque command value from the vehicle body side as the control signal CTL. The signal MRT is output to the wheel side controller 13 from a load state detector (not illustrated) that detects the state of the motor conversion unit 9 and the in-wheel motor 10.

As mentioned above, the vehicle body side controller 14 may perform control instead of the wheel side controller 13, or together with the wheel side controller 13, to keep the first DC voltage Vd1 constant. For example, the vehicle body side controller 14 may receive the signal MRT from the vehicle body side communication interface 18 and generate the second control signal CT2 in accordance with the number of revolutions and the torque command value of the in-wheel motor 10. At this time, the wheel side controller 13 includes the signal MRT in the control signal CTL and transmits the control signal CTL wirelessly from the wheel side communication interface 17 to the vehicle body side communication interface 18.

The vehicle body side current detector 19 may, for example, be a current sensor that detects a current Ia2 of the vehicle body side coil 5 and outputs the detected value to the vehicle body side controller 14. The vehicle body side controller 14 may generate the second control signal CT2 in accordance with the difference between the value detected by the vehicle body side current detector 19 (the current Ia2 of the vehicle body side coil 5) and a target current value corresponding to the number of revolutions and the torque command value of the in-wheel motor 10.

The in-wheel motor system 1 of this embodiment includes a configuration that is symmetric between the vehicle body side and the wheel side. For example, the configuration of the vehicle body side conversion unit 3 and of the wheel side conversion unit 8 is the same. In other words, the switches G11 to G14 correspond to the switches G1 to G4. In the power transmitter 100, the configuration of the vehicle body side coil 5 and of the wheel side coil 6 is the same, and the configuration of the vehicle body side resonance capacitor 4 and the wheel side resonance capacitor 7 is the same. In other words, in the circuit configuration example in FIG. 1, there are portions with mirror symmetry about a virtual boundary BD between the vehicle body side and the wheel side. With such a configuration, the in-wheel motor system 1 can transmit power P at high efficiency not only when powering the in-wheel motor 10, but also at the time of regeneration. When the in-wheel motor 10 is regenerating, the wheel side conversion unit 8 functions as an inverter, and the vehicle body side conversion unit 3 functions as a converter, which is opposite from when the in-wheel motor 10 is being powered.

In the in-wheel motor system 1, the vehicle body side conversion unit 3 and the wheel side conversion unit 8 having the same structure means that the fundamental waveform of the first control signal CT1 and the second control signal CT2 can be made the same. In other words, this means that the wheel side controller 13 and the vehicle body side controller 14 can share the main portion of control in common.

Figure 3:
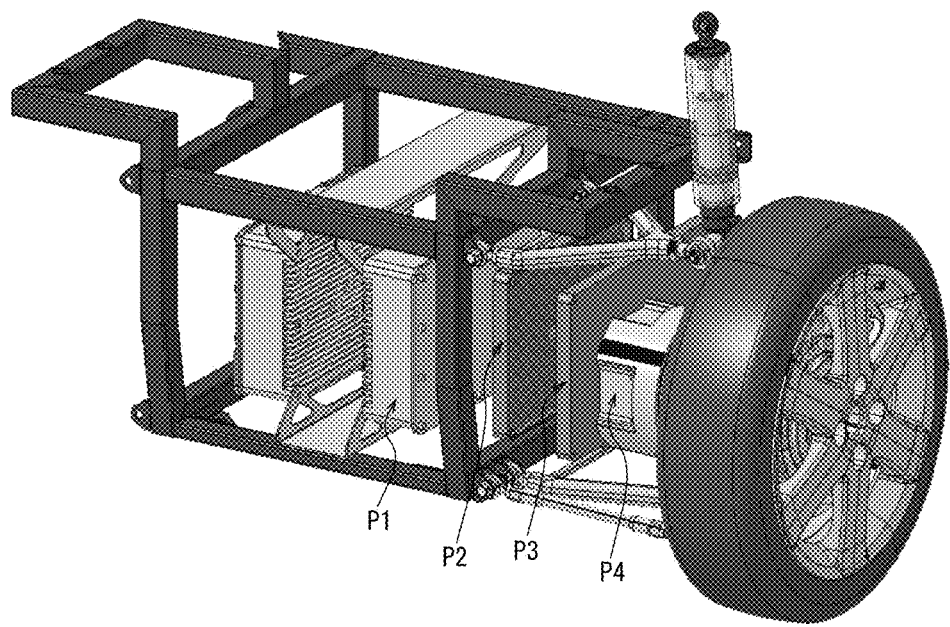
FIG. 3 illustrates an example of mounting the in-wheel motor system of this embodiment.

The constituent elements of the in-wheel motor system 1 as described above may, for example, be installed in an automobile in the form illustrated in FIG. 3. FIG. 3 is an enlargement of a portion inside an automobile, illustrating a vehicle body portion covered by a metal frame (to the left side of the page) and one wheel (to the right side of the page). A unit P1 is disposed at nearly the center of the vehicle body portion, and a unit P2 is disposed towards the wheel from the unit P1. On the wheel side, a unit P3 is disposed in a portion near the vehicle body, and a unit P4 is disposed in a portion near the wheel. The battery 2 is omitted from FIG. 3.

In FIG. 3, the unit P2 is the vehicle body side coil 5, and the unit P1 includes the constituent elements on the vehicle body side except for the vehicle body side coil 5 and the battery 2 (i.e. the capacitor 12, vehicle body side conversion unit 3, vehicle body side resonance capacitor 4, vehicle body side controller 14, vehicle body side communication interface 18, and vehicle body side current detector 19). Furthermore, in FIG. 3, the unit P3 is the wheel side coil 6, and the unit P4 includes the constituent elements on the wheel side except for the wheel side coil 6 (i.e. the in-wheel motor 10, motor conversion unit 9, wheel side capacitor 11, wheel side conversion unit 8, wheel side resonance capacitor 7, wheel side controller 13, wheel side communication interface 17, wheel side current detector 15, and voltage detector 16). The unit P1 and unit P4 do not need to include all of the constituent elements in the illustrated example, and it suffices for at least a portion thereof to be included.

As mentioned above, the in-wheel motor system 1 having a symmetrical configuration on the vehicle body side and the wheel side leads to a reduced number of components and common use of units in the case of installation in an automobile in the form illustrated in FIG. 3. For example, the unit P2 that is the vehicle body side coil 5 and the unit P3 that is the wheel side coil 6 may be common units. Such commonality reduces the number of types of units and can improve production efficiency at the time of installation.

The overall configuration of the in-wheel motor system 1 has been described with reference to FIGS. 1 to 3. The following describes a method of controlling the wheel side controller 13 and the vehicle body side controller 14 in detail while illustrating the waveform and the like of the first control signal CT1 and the second control signal CT2. The shape and the like of the vehicle body side coil 5 and wheel side coil 6 appropriate for the in-wheel motor system 1 are also described.

(Details on Method of Control)

Figure 4:
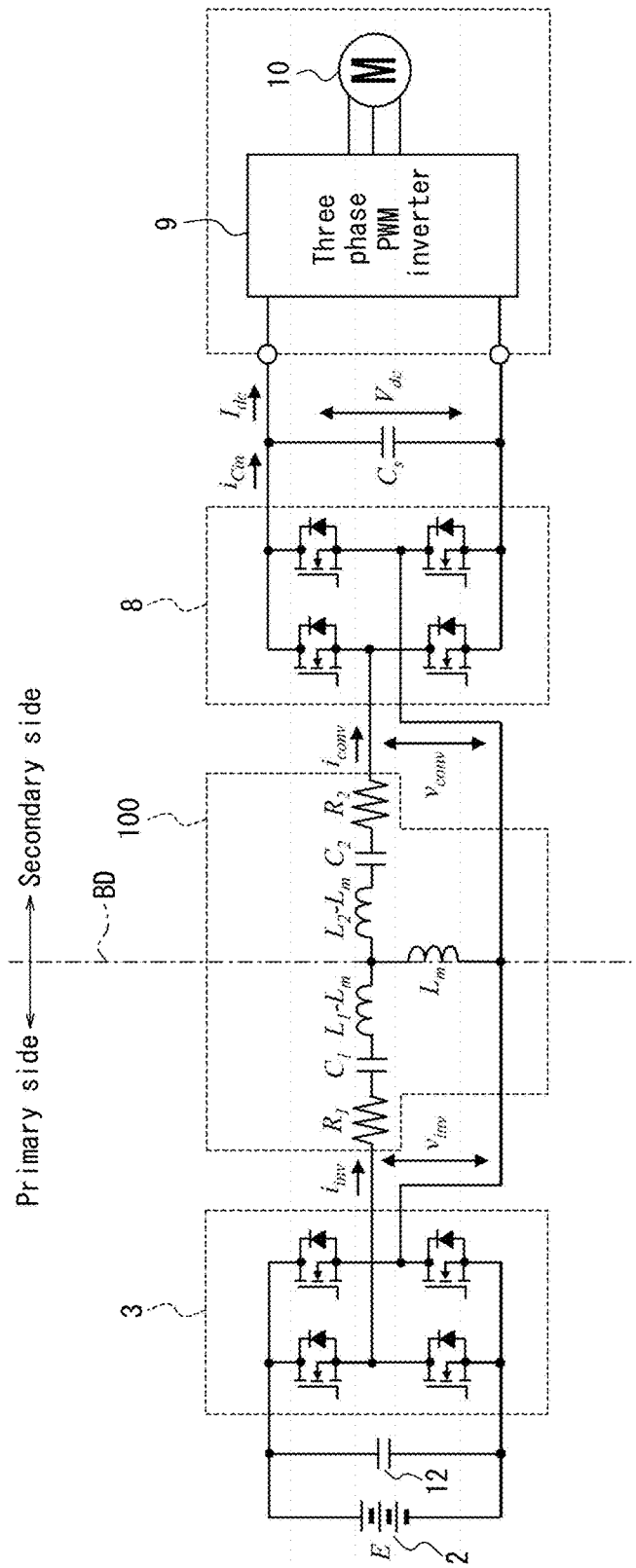
FIG. 4 is a partial schematic diagram of an in-wheel motor system that uses an equivalent circuit.

FIG. 4 is a partial schematic diagram of an in-wheel motor system 1 in which the power transmitter 100 is replaced by an equivalent circuit. The following describes the method of controlling the wheel side controller 13 and the vehicle body side controller 14 in detail with reference to FIG. 4. For the sake of clarity, the wheel side controller 13, vehicle body side controller 14, and communication interface 110 are omitted from FIG. 4, but these constituent elements are the same as in FIG. 1.

Operations when the in-wheel motor 10 is being powered are described here. The vehicle body side conversion unit 3 and motor conversion unit 9 are inverters, and the wheel side conversion unit 8 is a converter. In the example in FIG. 4, the PWM signal is used to perform control, as described below, and inverters and a converter that are voltage-type are used. Accordingly, to simplify the explanation, the vehicle body side conversion unit 3 is referred to as a voltage-type PWM inverter, the wheel side conversion unit 8 is referred to as a voltage-type PWM converter, and the motor conversion unit 9 is referred to as a three-phase voltage-type PWM inverter. The vehicle body side and wheel side in FIG. 1 are respectively represented as the primary side and secondary side in FIG. 4. When the in-wheel motor 10 is powered, power P is transmitted wirelessly from the primary side (i.e. the vehicle body side). The power P is received at the secondary side (i.e. the wheel side). When the in-wheel motor 10 is regenerating, the wheel side conversion unit 8 functions as an inverter, and the vehicle body side conversion unit 3 functions as a converter, but since the method of controlling the wheel side controller 13 and the vehicle body side controller 14 is the same, a description thereof is omitted.

In FIG. 4, the power transmitter 100 is replaced by an equivalent circuit configured with resistors, coils, and capacitors. In this equivalent circuit, the resistors respectively have resistance $R_1$ and $R_2$, the coils respectively have inductance $L_m$, $L_1$-$L_m$, and $L_2$-$L_m$, and the capacitors respectively have capacitance $C_1$ and $C_2$.

To simplify the explanation, the current Ia1 and first AC voltage Va1 of the wheel side coil 6 and the current Ia2 and second AC voltage Va2 of the vehicle body side coil 5 in FIG. 1 are respectively referred to as current $i_{conv}$, voltage $v_{conv}$, current $i_{inv}$, and voltage $v_{inv}$. The wheel side capacitor 11 and the first DC voltage Vd1 in FIG. 1 are respectively referred to in FIG. 4 as a smoothing capacitor Cs and a DC link voltage $V_{dc}$.

The current $i_{cin}$ in FIG. 4 is the current flowing into the smoothing capacitor Cs, and the current $I_{dc}$ is the DC link current. The battery 2, capacitor 12, and in-wheel motor 10 in FIG. 4 are the same as in FIG. 1, and a description thereof is omitted. Furthermore, in FIG. 4, the dotted line surrounding the motor conversion unit 9 and the in-wheel motor 10 indicates that these components are treated as a load.

In the in-wheel motor system 1 illustrated in FIG. 4, first, the voltage E of the battery 2 is converted to AC at the resonant frequency by the voltage-type PWM inverter on the primary side (vehicle body side conversion unit 3). The power P transmitted by magnetic resonance coupling is converted to DC by the voltage-type PWM converter on the secondary side (wheel side conversion unit 8). In the in-wheel motor system 1, the transmission power is controlled by controlling the duty ratio of the voltage-type PWM converter and the voltage-type PWM inverter with the first control signal CT1 and the second control signal CT2. The three-phase voltage-type PWM inverter (the motor conversion unit 9) is used for driving of the in-wheel motor 10, which is a load. Accordingly, the DC link voltage $V_{dc}$, which is the input voltage of the three-phase voltage-type PWM inverter, needs to be kept constant. Mounting space is limited in the in-wheel motor system 1, particularly on the secondary side. Therefore, even when the load varies, the DC link voltage $V_{dc}$ can preferably be kept constant with control by only the voltage-type PWM converter, for example. Control of the aforementioned duty ratio is described below after modeling the load and carefully considering the equivalent circuit of the power transmitter 100.

First, the load is modeled. In general, assuming that there is no loss when the fundamental power factor of the rectifying circuit on the power reception side is 1, it is known that the entire load including the rectifying circuit can equivalently be considered pure resistance (load resistance). This is defined as equivalent load resistance $R_L$. With respect to the load of the in-wheel motor 10 driven by the three-phase voltage-type PWM inverter, the mechanical output Pm of the in-wheel motor 10 is represented by Equation (1) below.

$$P_m = \eta_m \eta_{inv} V_{dc} I_{dc} \quad (1)$$

In Equation (1), $\eta_m$ is the motor efficiency, $\eta_{inv}$ is the inverter efficiency, and $I_{dc}$ is the DC link current.

Using the equivalent load resistance $R_L$ in Equation (1) yields Equation (2) below.

$$R_L = \eta_m \eta_{inv} \frac{V_{dc}^2}{P_m} \quad (2)$$

When the DC link voltage $V_{dc}$ is kept constant, the equivalent load resistance $R_L$ depends on the mechanical output Pm of the in-wheel motor 10. By introducing the equivalent load resistance $R_L$, the load (the motor conversion unit 9 and the in-wheel motor 10) can be treated with a similar analysis method as the pure resistance load.

Next, the equivalent circuit of the power transmitter 100 is considered in detail. In this equivalent circuit, a transfer function $G_{io}$ from the primary side voltage to the secondary side voltage is represented by Equation (3) below by solving respective voltage equations. Here, the coefficients are given by Equations (4) to (8) below, and the symbols thereof (such as $L_1$-$L_m$ and $C_1$) represent resistance, inductance, and capacitance, as mentioned above.

$$G_{io}(s) = \frac{b_3 s^3}{s^4 + a_3 s^3 + a_2 s^2 + a_1 s + a_0} \quad (3)$$

$$a_3 = \frac{L_1(R_2 + R_L) + R_1 L_2}{L_1 L_2 - L_m^2} \quad (4)$$

$$a_2 = \frac{R_1 C_2 (R_2 + R_L) + C_1 L_1 + C_2 L_2}{C_1 C_2 (L_1 L_2 - L_m^2)} \quad (5)$$

$$a_1 = \frac{R_1 C_1 + C_2(R_2 + R_L)}{C_1 C_2 (L_1 L_2 - L_m^2)} \quad (6)$$

$$a_0 = \frac{1}{C_1 C_2 (L_1 L_2 - L_m^2)} \quad (7)$$

$$b_3 = \frac{L_m}{L_1 L_2 - L_m^2} \quad (8)$$

As compared to the gain in the resonant frequency, the gain of the harmonic component is sufficiently small. Therefore, only the resonant frequency component, which is the fundamental, is focused on below. Here, the dynamics of the smoothing capacitor Cs are examined. The transfer function from current $i_{cin}$ flowing into the smoothing capacitor Cs (the wheel side capacitor 11 in FIG. 1) to the terminal voltage of the equivalent load resistance $R_L$ (DC link voltage $V_{dc}$) can be represented as a first-order lag system as in Equation (9) below.

$$G_{Cs}(s) = \frac{R_L}{R_L C_s s + 1} \quad (9)$$

Figure 5A:
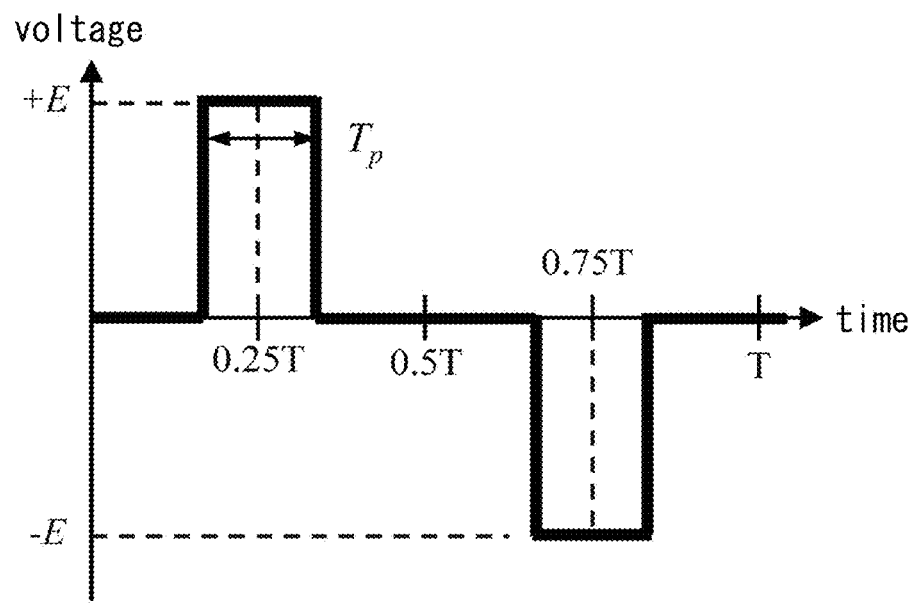
FIGS. 5A and 5B illustrate the switching states of a PWM inverter and a PWM converter.

Below, the relationship between i) the duty ratio of the voltage-type PWM inverter on the primary side (vehicle body side conversion unit 3) and the voltage-type PWM converter on the secondary side (wheel side conversion unit 8) and ii) the DC link voltage $V_{dc}$ is described. The voltage-type PWM inverter and the voltage-type PWM converter each operate in the switching states in FIGS. 5A and 5B. In other words, the voltage-type PWM inverter and the voltage-type PWM converter each switch between three levels (in the example in FIG. 5A, +E, 0 (zero), and −E). Here, the duty ratio is defined as $T_p/(0.5\,T)$, which is the ratio of the pulse width $T_p$ to the half cycle 0.5 T (see FIGS. 5A and 5B). For example, when the duty ratio in the voltage-type PWM inverter on the primary side is 1.0, the waveform is a square wave with a voltage of ±E and does not have a 0 (zero) state.

Focusing only on the fundamental for the voltage-type PWM inverter, the fundamental amplitude $V_{inv1}$ of the output voltage thereof with respect to the duty ratio $d_{inv}$ is sought by Equation (10) below with a Fourier series expansion.

$$V_{inv1} = \frac{4E}{\pi}\sin\frac{\pi d_{inv}}{2} \quad (10)$$

Figure 5B:
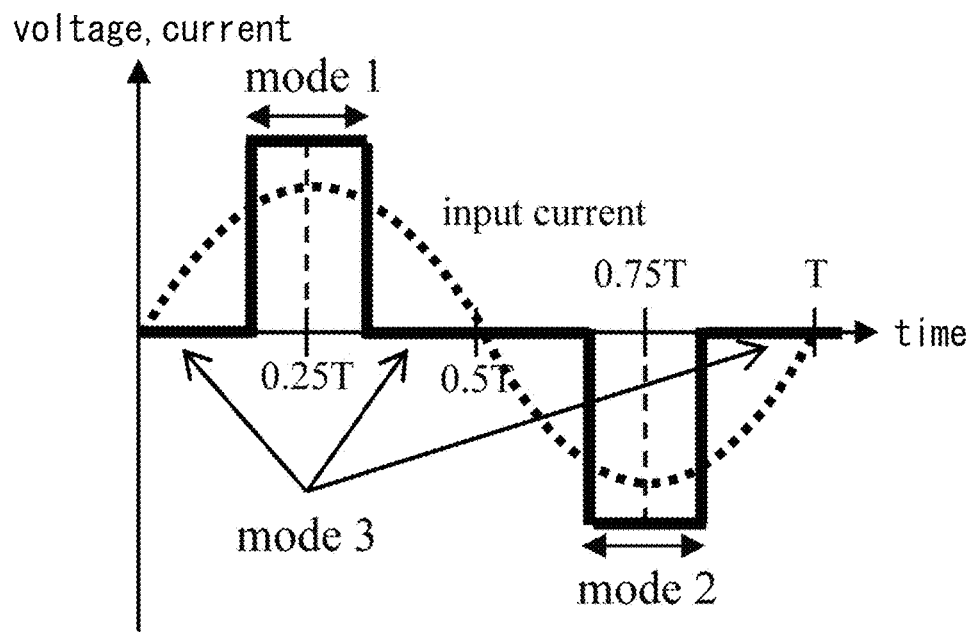

As illustrated in FIG. 5B, the voltage-type PWM converter (wheel side conversion unit 8) operates in three switching modes that can be switched between by the first control signal CT1 (see FIG. 1). In FIG. 5B, the three switching modes are indicated as mode 1, mode 2, and mode 3. Since the voltage-type PWM converter (wheel side conversion unit 8) and the voltage-type PWM inverter (vehicle body side conversion unit 3) have the same structure as mentioned above, the voltage-type PWM inverter can also be caused to operate in three switching modes by the second control signal CT2 (see FIG. 1), but to avoid redundant explanation, only the voltage-type PWM converter is described here in detail.

Figure 6A:
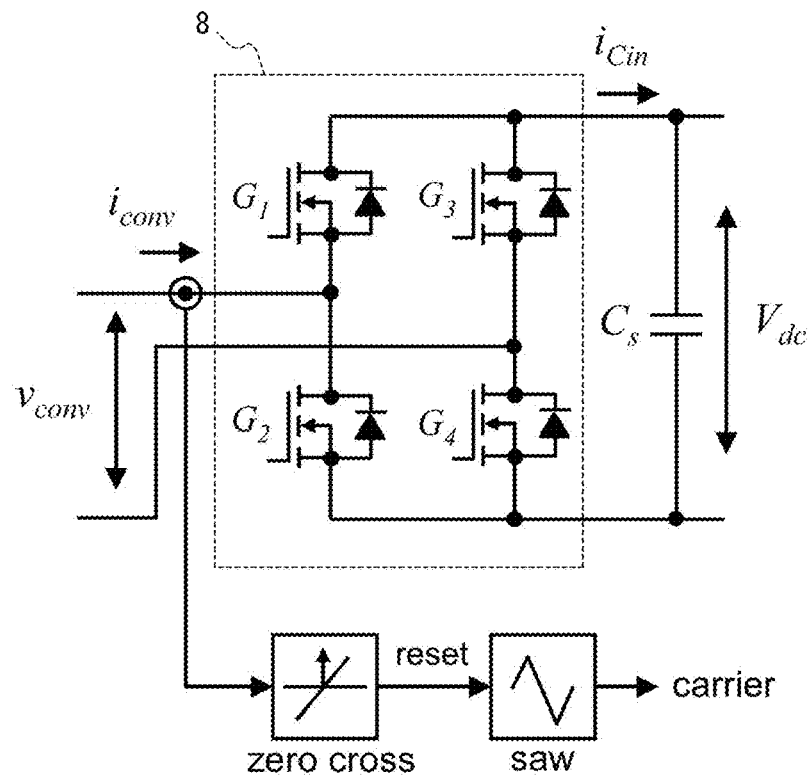
FIGS. 6A and 6B illustrate the average through current of the PWM converter.

FIG. 6A is an expanded view of a portion of the voltage-type PWM converter (wheel side conversion unit 8) in FIG. 4, illustrating the switches G1 to G4. With reference to FIG. 6A, the three switching modes are described. The first control signal CT1 (see FIG. 1) causes the voltage-type PWM converter to operate in the first mode (mode 1) by turning switch G1 and switch G4 on. The first control signal CT1 causes the voltage-type PWM converter to operate in the second mode (mode 2) by turning switch G2 and switch G3 on. The first mode and the second mode are modes for causing current to flow into the smoothing capacitor Cs from the coil on the secondary side and are a state of connection to the load resistance. The first control signal CT1 causes the voltage-type PWM converter to operate in the third mode (mode 3) by turning switch G2 and switch G4 on. The third mode is a short-circuit condition in which the load resistance is zero. The first control signal CT1 can adjust the duration in which the voltage is zero by causing the voltage-type PWM converter to operate in the third mode.

Unlike the first mode and the second mode, the load resistance becomes zero in the third mode. Therefore, the apparent load resistance varies depending on the proportion of the third mode. An apparent load resistance $R_{La}$ corresponding to the duty ratio $d_{conv}$ of the voltage-type PWM converter is thus introduced, as indicated in Equation (11) below.

$$R_{LA} = R_L d_{conv} \quad (11)$$

An amplitude $I_{conv}$ of the input current of the voltage-type PWM converter is represented by Equation (12) below, where the driving angular frequency of the voltage-type PWM inverter is $\omega_{in}$.

$$I_{conv} = |G_{ioa}(j\omega_{in})| V_{inv1} \quad (12)$$

In a transfer function $G_{ioa}$, however, the equivalent load resistance $R_L$ is replaced by the apparent load resistance $R_{La}$. Here, when the time constant in the first-order lag system of the smoothing capacitor Cs is sufficiently slow with respect to the driving frequency, the current $i_{cin}$ flowing into the smoothing capacitor Cs can be treated as an average value.

Figure 6B:
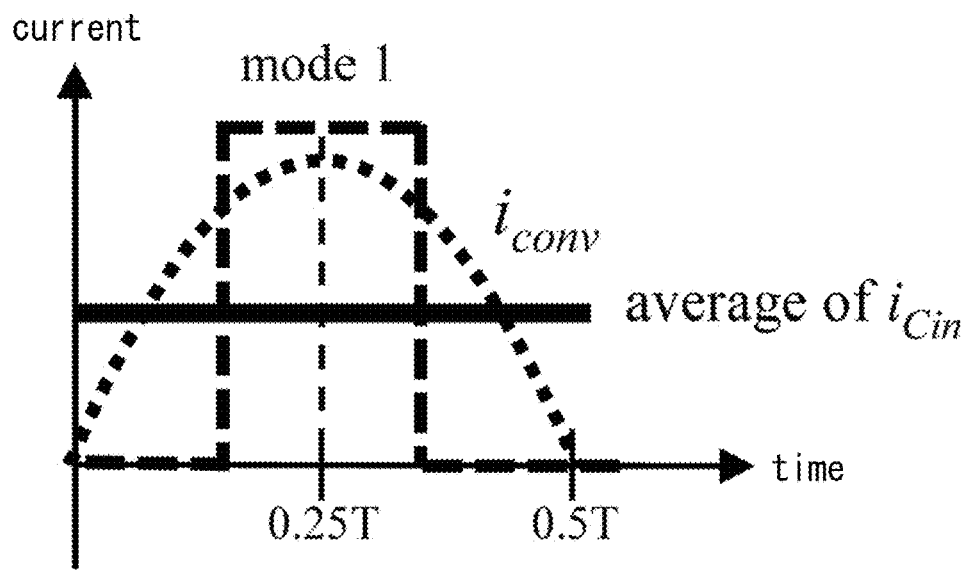

Here, FIG. 6B is an expanded view of a half cycle (0 to 0.5 T) of FIG. 5B, showing the average value of the current $i_{cin}$ flowing into the smoothing capacitor Cs in overlap. Since current only passes in the interval of the duty ratio $d_{conv}$, i.e. only in the first mode (or the second mode), the average current $I_{Cave}$ flowing into the smoothing capacitor Cs is represented by Equation (13) below.

$$I_{Cave} = \frac{1}{\pi}\int_{\frac{\pi}{2}-\frac{\pi}{2}d_{conv}}^{\frac{\pi}{2}+\frac{\pi}{2}d_{conv}} I_{conv}\sin\theta\, d\theta = \frac{2}{\pi}I_{conv}\sin\frac{\pi d_{conv}}{2} \quad (13)$$

Recalculating Equation (13) using Equation (10) and Equation (12) yields Equation (14) below.

$$I_{Cave} = \frac{8E}{\pi^2}|G_{ioa}(j\omega_{in})|\sin\frac{\pi d_{inv}}{2}\sin\frac{\pi d_{conv}}{2} \quad (14)$$

Accordingly, the steady-state value of the DC link voltage $V_{dc}$ is as in Equation (15) below.

$$V_{dc}|_{t=\infty} = \frac{8ER_L}{\pi^2}|G_{ioa}(j\omega_{in})|\sin\frac{\pi d_{inv}}{2}\sin\frac{\pi d_{conv}}{2} \quad (15)$$

Here, in the term $R_L|G_{ioa}(j\omega_{in})|$, the factors that dynamically change due to load variation and relative displacement of the coils are the equivalent load resistance $R_L$, the duty ratio $d_{conv}$ of the voltage-type PWM converter, and the inductance $L_m$ of the coil in the power transmitter 100. Therefore, replacing this term with $K(R_L, L_m, d_{conv})$ yields Equation (16) below.

$$V_{dc}|_{t=\infty} = \frac{8E}{\pi^2}K(R_L, L_m, d_{conv})\sin\frac{\pi d_{inv}}{2}\sin\frac{\pi d_{conv}}{2} \quad (16)$$

During generation of the switching signal (first control signal CT1), a carrier signal needs to be synchronized with a converter input current (current $i_{conv}$) in order to set the fundamental power factor to 1 in the input of the voltage-type PWM converter (wheel side conversion unit 8). As a method for doing so, the wheel side controller 13 receives the current $i_{conv}$ detected by the wheel side current detector 15 (see FIG. 1). It then suffices for the wheel side controller 13 to generate the PWM carrier with the timing at which the current $i_{conv}$ exhibits a zero cross as a reference, as illustrated in FIG. 6A. A specific method for detecting the zero cross point of the current $i_{conv}$ is for the wheel side controller 13 to detect a sign change in the current $i_{conv}$ and set the timing of the detected sign change to be the zero cross point.

Next, stabilization control of the DC link voltage $V_{dc}$ is examined, focusing on the division of functions between the primary side and the secondary side. In power transmission to a load for which power varies, such as the in-wheel motor 10 (variable power load), the power required by the load needs to be supplied instantaneously. In the case where a voltage-type inverter is included as the load, by keeping the DC link voltage $V_{dc}$ constant, the equivalent load resistance $R_L$ changes in accordance with the power required by the load. Therefore, the supply of necessary power is achieved by performing control so as to keep the DC link voltage $V_{dc}$ constant. In the in-wheel motor system 1, as described above, the duty ratio of the voltage-type PWM converter may be controlled, or the duty ratio of the voltage-type PWM inverter may be controlled. In other words, the in-wheel motor system 1 has two degrees of control freedom, in that either the primary side or the secondary side can be controlled. The in-wheel motor system 1, however, transfers information between the primary side and the secondary side by wireless communication with the communication interface 110. As a result, the communication speed may be limited, and a communication delay may occur. Therefore, in the in-wheel motor system 1, feedforward control is preferably performed in the voltage-type PWM inverter on the primary side, and feedback control is preferably performed on the DC link voltage $V_{dc}$ in the voltage-type PWM converter on the secondary side.

First, the feedforward control in the voltage-type PWM inverter on the primary side is described. When the angular velocity of the motor can be acquired by wireless communication and the torque response of the motor is sufficiently fast with respect to the command value, then by Equation (2), the equivalent load resistance $R^*_L$ is determined by the mechanical output $P^*m$ of the in-wheel motor 10 and the target value $V^*_{dc}$ of the DC link voltage. In practice, it is necessary to take into consideration the efficiency characteristics of the in-wheel motor 10 and the three-phase voltage-type inverter. Therefore, a map (table) of the equivalent load resistance $R^*_L$ with respect to the mechanical output $P^*m$ of the in-wheel motor 10 is preferably prepared in advance. At this time, the nominal value may be used as the aforementioned inductance Lm (mutual inductance).

Here, the power P transmitted from the primary side allows for performance of feedback control on the secondary side. The nominal value of the duty ratio at which the voltage-type PWM converter on the secondary side is operated (the value when feedforward control in the voltage-type PWM inverter on the primary side is ideal) is labelled $d_{convn}$. At this time, the command value $d^*_{inv}$ of the duty ratio of the voltage-type PWM inverter with respect to the target value $V^*_{dc}$ of the DC link voltage is sought by Equation (17) below from Equation (16).

$$d^*_{inv} = \frac{2}{\pi}\sin^{-1}\left(\frac{\pi^2 V^*_{dc}}{8EK(R_L, R_m, d_{convn})\sin\frac{\pi d_{convn}}{2}}\right) \quad (17)$$

On the other hand, the voltage-type PWM converter on the secondary side controls the DC link voltage $V_{dc}$ with two degrees of freedom using the dynamics of the smoothing capacitor Cs as a plant (controlled object). In other words, the voltage-type PWM converter on the secondary side controls the DC link voltage $V_{dc}$ with two degrees of freedom using the transfer function from the current flowing into the smoothing capacitor Cs to the DC link voltage $V_{dc}$, as represented in Equation (9). Here, since the transient characteristics of the equivalent circuit of the power transmitter 100 are sufficiently fast as compared to the response of the smoothing capacitor Cs, the transient characteristics can be ignored. As the equivalent load resistance $R_L$, the aforementioned equivalent load resistance $R^*_L$ is used, and the nominal value is used for the aforementioned inductance Lm. For example, the feedback controller of the wheel side controller 13 performs pole placement at the multiple roots of −p [rad/s] as PI control.

$$C_{PI}(s) = K_p + K_i\frac{1}{s} \quad (18)$$

$$K_p = \frac{2pR^*_L C_s - 1}{R^*_L} \quad (19)$$

$$K_i = p^2 C_s \quad (20)$$

The feedforward controller of the wheel side controller 13 obeys Equation (21) below with an inverse plant and a low-pass filter of a cutoff frequency $\Omega_c$ [rad/s].

$$C_{FF}(s) = \frac{\omega_c}{s + \omega_c} G^{-1}_{Cs}(s) \quad (21)$$

The amount of operation of the wheel side controller 13 is the average current $I^*_{Cave}$ flowing into the smoothing capacitor Cs, and the command value $d^*_{conv}$ of the duty ratio is represented by Equation (22) below from Equation (16).

$$d^*_{conv} = \frac{2}{\pi}\sin^{-1}\left(\frac{\pi^2 R^*_L I^*_{cave}}{8EK(R_L, L_m, d_{convn})\sin\frac{\pi d^*_{inv}}{2}}\right) \quad (22)$$

Figures 7A, 7B:
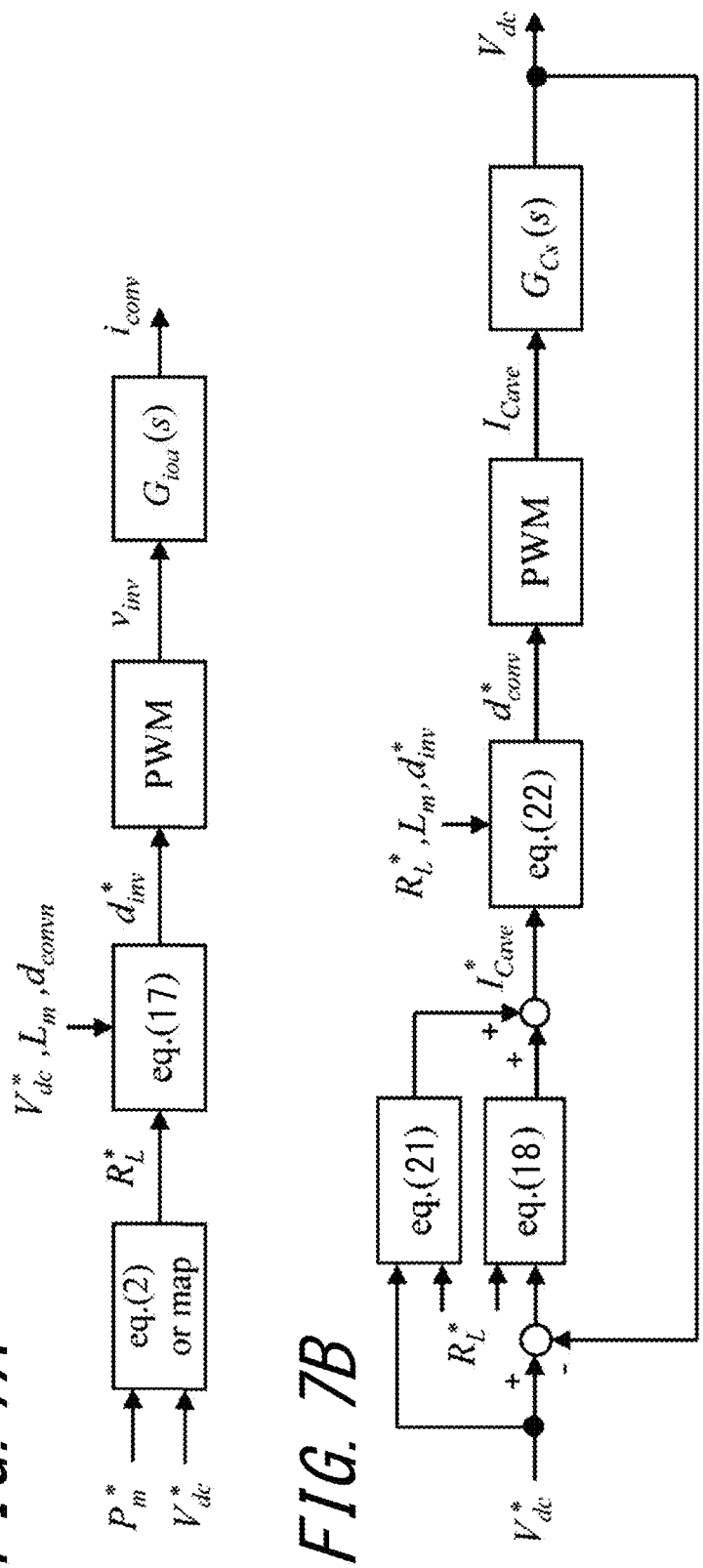
FIGS. 7A and 7B are block diagrams of DC link voltage stabilization control.

FIGS. 7A and 7B summarize the above-described stabilization control of the DC link voltage $V_{dc}$. FIG. 7A represents control on the primary side, and FIG. 7B represents control on the secondary side. First, as illustrated in FIG. 7A, the vehicle body side controller 14 acquires the mechanical output $P^*m$ of the in-wheel motor 10 and the target value $V^*_{dc}$ of the DC link voltage and determines the equivalent load resistance $R^*_L$ based on at least one of Equation (2) and the aforementioned map (table). Subsequently, the vehicle body side controller 14 seeks the command value $d^*_{inv}$ of the duty ratio of the voltage-type PWM inverter according to Equation (17) and performs PWM control. At this time, the voltage $v_{inv}$ is generated, and the current $i_{conv}$ flows at the secondary side.

As illustrated in FIG. 7B, the wheel side controller 13 acquires the target value $V^*_{dc}$ of the DC link voltage, performs feedforward control according to Equation (21), and performs PI control according to Equation (18). The wheel side controller 13 then seeks the command value $d^*_{conv}$ of the duty ratio of the voltage-type PWM converter according to Equation (22) and performs PWM control. The DC link voltage $V_{dc}$ is then generated, and the value thereof is provided as feedback.

(Shape and Material of Coil)

The vehicle body side coil 5 and wheel side coil 6 of the in-wheel motor system 1 may be of any type, but the following shape and material are preferred. Below, the vehicle body side coil 5 and the wheel side coil 6 are assumed to be of the same shape and material and are collectively referred to simply as coils.

First, the coils could, for example, have a helical or flat shape, but since the mounting space for the power transmission and reception coils is limited, as illustrated in FIG. 3, a flat shape that is compact and is not easily affected by surrounding objects is preferable.

For heat resistance and to reduce the skin effect, litz wire, for example, is considered to be appropriate as the wire material of the coil. In order to reduce the leakage flux, ferrite is preferably inserted into the coil. The main possibilities for arrangement of the ferrite are arrangement on the front side of the coil and arrangement on the back side of the coil. Several experiments revealed that by arranging the ferrite on the back side of the coil, the efficiency of transmitting power P can be increased. This is thought to be because a large mutual inductance is obtained when arranging the ferrite on the back side of the coil.

As described above, the in-wheel motor system 1 according to this embodiment is provided with the power transmitter 100 that utilizes a resonance phenomenon using a magnetic field. The power transmitter 100 for example uses the magnetic resonance coupling method and therefore tolerates misalignment better than the electromagnetic induction method. Therefore, the in-wheel motor 10 can be driven stably even if misalignment occurs between the vehicle body side coil 5 and the wheel side coil 6. Furthermore, by providing the power transmitter 100 that utilizes a resonance phenomenon using a magnetic field, power P can be transmitted wirelessly from the road surface to the wheel side (power feeding from the road surface).

Although this disclosure is based on embodiments and drawings, it is to be noted that various changes and modifications will be apparent to those skilled in the art based on this disclosure. Therefore, such changes and modifications are to be understood as included within the scope of this disclosure.

REFERENCE SIGNS LIST

1 In-wheel motor system
2 Battery
3 Vehicle body side conversion unit
4 Vehicle body side resonance capacitor
5 Vehicle body side coil
6 Wheel side coil
7 Wheel side resonance capacitor
8 heel side conversion unit
9 Motor conversion unit
10 In-wheel motor
11 Wheel side capacitor
12 Capacitor
13 Wheel side controller
14 Vehicle body side controller
15 Wheel side current detector
16 Voltage detector
17 Wheel side communication interface
18 Vehicle body side communication interface
19 Vehicle body side current detector
20 Coil
21 Power supply
100 Power transmitter
110 Communication interface

The invention claimed is:

1. An in-wheel motor system comprising:
a power transmitter that utilizes a resonance phenomenon using a magnetic field;
a communication interface configured to communicate between a vehicle body and a wheel;
a in-wheel motor;
a motor conversion unit configured to convert a first DC voltage into a motor AC voltage that drives the in-wheel motor during powering;
a wheel side capacitor configured to smooth the first DC voltage during powering;
a wheel side conversion unit configured to convert a first AC voltage from a wheel side coil into the first DC voltage during powering; and
a wheel side controller configured to control, with a first control signal, switching of a switch provided in the wheel side conversion unit; wherein
the power transmitter comprises:
the wheel side coil, configured to receive wirelessly transmitted power at the wheel side during powering; and
a wheel side resonance capacitor inserted in series between the wheel side conversion unit and the wheel side coil;
the power transmitter transmits power wirelessly from the vehicle body to the in-wheel motor mounted in the wheel;
the communication interface wirelessly transmits a control signal for driving the in-wheel motor; and
the wheel side controller generates the first control signal with the timing at a zero cross point of a current of the wheel side coil as a reference, so as to control the first DC voltage to be constant.

2. The in-wheel motor system of claim 1, wherein the wheel side controller generates the first control signal so that a fundamental power factor of the first AC voltage and the current of the wheel side coil becomes 1.

3. The in-wheel motor system of claim 1, wherein with the first control signal, the wheel side controller adjusts a duration that the first AC voltage is zero.

4. The in-wheel motor system of claim 1, further comprising:
a wheel side current detector configured to detect a current of the wheel side conversion unit; wherein
the wheel side controller detects a sign change in a current of the wheel side coil with the wheel side current detector and generates the first control signal in accordance with information on the detected sign change.

5. The in-wheel motor system of claim 1, further comprising:
a voltage detector configured to detect the first DC voltage; wherein
the wheel side controller generates the first control signal in accordance with a difference between a value detected by the voltage detector and a target value of the first DC voltage.

6. The in-wheel motor system of claim 5, wherein the wheel side controller generates the first control signal in accordance with a number of revolutions and a torque command value of the in-wheel motor.

7. The in-wheel motor system of claim 1, further comprising:
a vehicle body side conversion unit configured to convert a second DC voltage from a battery into a second AC voltage and output the second AC voltage to a vehicle body side coil during powering; and
the battery; wherein
the power transmitter comprises:
the vehicle body side coil, configured to transmit power wirelessly from the vehicle body during powering; and
a vehicle body side resonance capacitor inserted in series between the vehicle body side conversion unit and the vehicle body side coil.

8. The in-wheel motor system of claim 7, further comprising:
a vehicle body side controller configured to control, with a second control signal, switching of a switch provided in the vehicle body side conversion unit in accordance with a control signal from the communication interface; wherein
the vehicle body side controller generates the second control signal so as to control the first DC voltage to be constant.

9. The in-wheel motor system of claim 8, wherein the vehicle body side controller generates the second control signal in accordance with a number of revolutions and a torque command value of the in-wheel motor.

10. The in-wheel motor system of claim 8, further comprising:
a vehicle body side current detector configured to detect a current of the vehicle body side conversion unit; wherein the vehicle body side controller generates the second control signal in accordance with a difference between a value detected by the vehicle body side current detector and a target current value corresponding to a number of revolutions and a torque command value of the in-wheel motor.

11. The in-wheel motor system of claim 7, wherein during regeneration of the in-wheel motor, the wheel side conversion unit functions as an inverter, and the vehicle body side conversion unit functions as a converter.

* * * * *